(No Model.)

H. ORCHARD.
HAY STACKER.

No. 320,443. Patented June 16, 1885.

Witnesses:
H. M. Mills
A. Keithley

Inventor
Henry Orchard,
per A. B. Upham,
His Attorney.

UNITED STATES PATENT OFFICE.

HENRY ORCHARD, OF PEORIA, ILLINOIS, ASSIGNOR OF ONE-HALF TO A. V. VENELL, OF SAME PLACE.

HAY-STACKER.

SPECIFICATION forming part of Letters Patent No. 320,443, dated June 16, 1885.

Application filed October 17, 1884. (No model.)

*To all whom it may concern:*

Be it known that I, HENRY ORCHARD, of Peoria, in the county of Peoria, in the State of Illinois, have invented an Improved Hay-Stacker; and I do hereby declare that the following is a full, clear, and exact description thereof, reference being had to the annexed drawings, making a part of this specification, in which like letters of reference refer to like parts, and in which—

Figure 1:
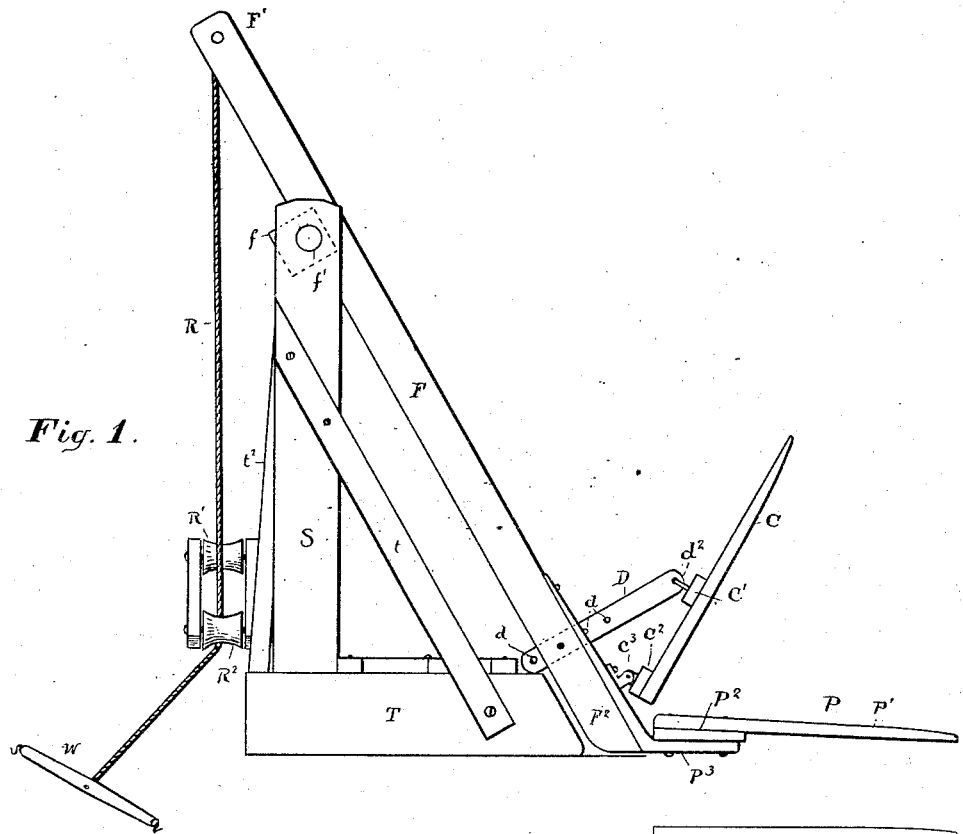
Figure 2:
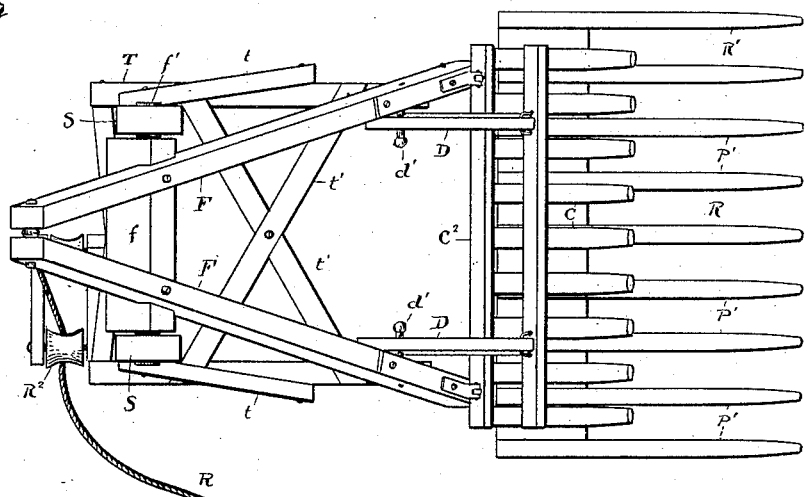

Figure 1 represents a side elevation of the stacker; Fig. 2, a plan view of the same.

This invention pertains to the class of mechanisms for raising hay from the ground and depositing it in heaps or stacks, in which a skeleton platform fast at the end of a pivoted frame is adapted by the upward oscillation of said frame to deposit in a rick or stack the hay delivered upon said platform by the rake.

The advantages which I accomplish by my construction are, first, simplicity of arrangement, and, secondly, to attain the maximum height of elevation of the hay with the minimum length of frame and height of standard. Said pivotal point being also at the upper end of the supporting frame-work or standard, the altitude to which the skeleton platform is raised is equal to the length of pivoted frame from its pivotal axis plus the height of said standard.

As shown in the drawings, F is the frame supporting at its extremity the skeleton-platform P and pivoted at $f$ to the upper ends of the vertical standard beams $s$.

My pivotal device consists of a short, strong beam, $f$, firmly fastened to the frame-beams F, and having gudgeons, $f'$, pass through bearings in said standard and deeply set into the ends of said beam F. The frame F is triangularly arranged, coming together at F' and widely separated at the lower end. At the apex F' is fastened one end of a rope, R, which passes down between the sheaves R' R², and is fast to the whiffletree $w$, by which the rope is pulled, the end F' of frame depressed, and the opposite end thereof elevated.

The skeleton platform P consists of a series of parallel teeth, P', rigidly projecting from a board, P². Said board is fastened to the lower ends of the frame-beams F by means of angle-irons P³. A second series of teeth, $c$, secured to cross-boards $c'$ $c^2$ and angularly adjustable relative to the platform P, retain the hay in place on said platform while the same is being raised, and cause the hay, when delivered therefrom by the force of the throw, to fall clear therefrom. Said teeth $c$ are hinged to the frame F by means of hinges or pivots $c^3$ and by means of the braces D, pivoted or hinged to the cross-board $c'$, a pin, $d'$, and several holes, $d$, in each brace. Said teeth $c$ are adapted to be secured at any desired angle relative to the platform P. The standard-beams $s$ are fastened at their lower ends to the base-timbers T T, held together by diagonal braces $t'$ $t'$. Inclined props $t$ $t$ and diagonals $t^2$ $t^7$ secure said standard more firmly to its base-timbers.

What I claim as my invention, and for which I desire Letters Patent, is as follows, to wit:

The standard, consisting of upright beams $s$, horizontal timbers T, and braces $t$ $t'$ and $t^2$, in combination with the beam $f$ and gudgeons $f'$, adapted to revolve in bearings at the upper ends of said beams $s$, triangularly-arranged frame-beams F, rigidly secured to said beam $f$, a rope, R, fastened to the end F' of said frame-beams and passing between sheaves R' R², the skeleton platform P affixed to the ends F² of said frame beams by the angle-irons P³, the teeth $c$ having securing cross-boards $c'$ $c^2$, hinges $c^3$, for pivotally holding said teeth to the said frame F, the perforated braces D, pivoted to said teeth, and the pins $d$, whereby said teeth may be angularly adjusted, substantially as and for the purpose specified.

In testimony that I claim the foregoing invention I have hereunto set my hand and seal this 6th day of October, 1884.

HENRY ORCHARD. [L. S.]

Witnesses:
 A. B. UPHAM,
 A. KEITHLEY.